United States Patent [19]

Drake

[11] 4,160,341
[45] Jul. 10, 1979

[54] GARDEN CANOPY

[76] Inventor: James A. Drake, 1132 Burgess Blvd., Dallas, Tex. 75207

[21] Appl. No.: 819,171

[22] Filed: Jul. 26, 1977

[51] Int. Cl.² ............................................. A01G 13/00
[52] U.S. Cl. ..................................... 47/28 R; 52/342; 47/31
[58] Field of Search .................... 52/75–78, 52/342, 473, 660; 47/20, 26–28, 30–31, 17

[56] References Cited

U.S. PATENT DOCUMENTS

| 2,031,402 | 2/1936 | Wirick | 47/28 |
| 2,735,224 | 2/1956 | Estey | 47/26 |
| 2,741,874 | 4/1956 | Denning | 47/28 |
| 2,827,736 | 3/1958 | Estey | 47/28 |
| 2,906,060 | 9/1959 | Estey | 47/26 |

FOREIGN PATENT DOCUMENTS

| 7296 | 4/1879 | Fed. Rep. of Germany | 47/26 |
| 344263 | 11/1921 | Fed. Rep. of Germany | 47/26 |
| 846179 | 8/1952 | Fed. Rep. of Germany | 47/26 |

*Primary Examiner*—Robert E. Bagwill
*Attorney, Agent, or Firm*—Richards, Harris & Medlock

[57] ABSTRACT

Disclosed is a garden canopy having a frame for supporting a plurality of parallel spaced elongate panels. The panels are positioned on the frame to provide a light and moisture aperture therebetween. The panels are formed from uniform wall thickness material and each have a flat bottom with curved or arcuate edges.

1 Claim, 2 Drawing Figures

GARDEN CANOPY

BACKGROUND OF THE INVENTION

The present invention relates generally to improvements in garden canopies. In another aspect, this invention relates to a new and improved elevated garden canopy with panels having edges to control the water and light entering the garden area.

DESCRIPTION OF THE PRIOR ART

In the provision of canopies over garden areas where plants are grown or stored, it has become a practice to protect the plants from harsh atmospheric seasonal conditions which may exist by providing a covering such as a canopy or the like.

It has been found that some plants maintained in containers prior to planting or during early growing stages cannot endure the environment directly. In such situations it is desirable to protect the plants from harsh sun and rain.

To accomplish this, canopies have been constructed using a plurality of elongated thin panels of wooden material which are positioned in a parallel spaced arrangement on an elevated frame. These wooden strips are made from material such as cedar, redwood, fur and the like and provide apertures between the individual panels.

One problem which has been found to exist is that due to the shape of the panel member the width of the light aperture varies drastically as the sun moves. As the sun moves from its highest point the aperture substantially decreases in cross section. With these structures, if the maximum aperture between the individual panels to prevent damage to plants by the sun's rays is selected at the sun's apex, then during substantial periods of the day less than the maximum amount of sunlight will enter the garden area. In addition, in seasons of heavy rainfall no provision is made to carry off water from the top of the canopy and therefore the water falls through the apertures. When plants are stored in containers below the canopy the plants can become flooded and/or the soil eroded from the plants.

Therefore, according to one embodiment of the invention, an improved canopy is provided which includes a plurality of panels forming troughs to carry off excess water from on top of the canopy. According to another aspect of the invention, the improved canopy of the present invention is formed from panels of a uniform wall thickness with arcuate or curved edges to border the light aperture between the individual panels and provide edge surfaces for the aperture which prevent extreme variations of the amount of light entering the aperture at or about the apex of the sun's travel.

The objects and many of the attendant advantages of this invention will be readily appreciated by those of ordinary skill in the art as the same becomes better understood by reference to the following detailed description considered in connection with the accompanying drawings in which:

DESCRIPTION OF THE PREFERRED EMBODIMENTS

Figure 1:
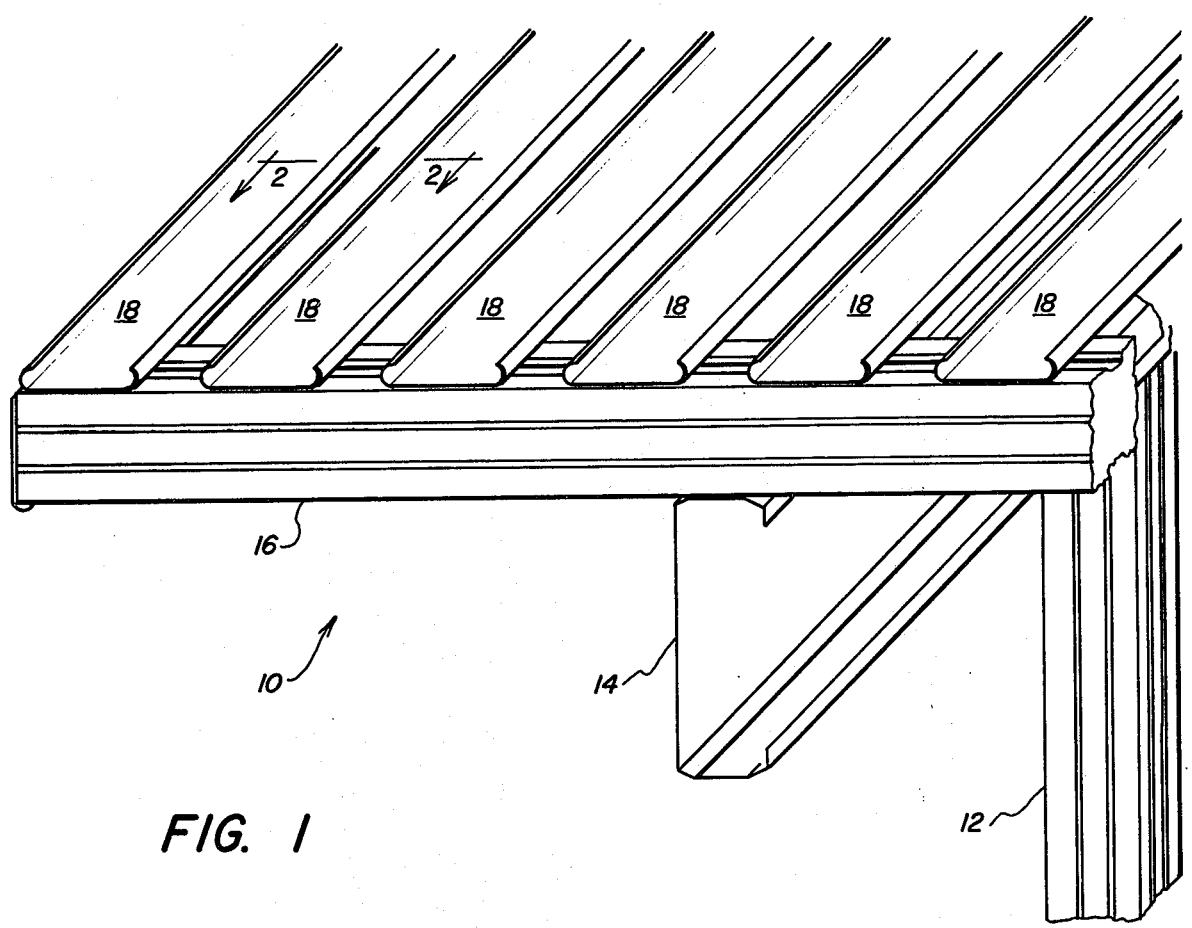
FIG. 1 illustrates a partial perspective view of a portion of the canopy of the present invention showing the support columns, support beams, stringer and panel members mounted thereon.

Referring now to the drawings, wherein like reference characters designate like and corresponding parts throughout the views, there is shown an improved canopy of the present invention which for purposes of description is generally identified by reference numeral 10. The canopy is of the type having a plurality of vertically extending columns 12 which in the present embodiment is tubing formed from metallic material. Columns 12 can be set in the ground or anchored in concrete and are spaced about the area over which the canopy is erected.

A plurality of channel shaped support beams 14 extend between the individual columns and are fixed thereto in their conventional manner by fasteners not shown. A plurality of these support beam and column combinations are provided in a parallel spaced arrangement across the area to be covered.

A plurality of stringers 16 are attached to and supported by the support beams 12. Stringers 16 are positioned in a parallel spaced arrangement on the support beams 14 and are attached thereto by conventional fasteners not shown. The stringers can be constructed from square tubings of the same size as the columns 12.

Each of the stringers 16 supports a plurality of elongate panels 18 thereon. The panels 18 are constructed from a uniform thickness metallic material such as aluminum and are of sufficient length to span the distance between the individual stringers 16. According to a particular feature of the present invention the panels 18 are formed in the configuration of a trough or channel having a bottom 20 and arcuate or curved sides 22. These curved sides 22 in the preferred embodiment have a semicircular cross section.

The individual panels 18 are positioned in a spaced parallel relationship and in the preferred embodiment the panels themselves extend lengthwise in a north to south direction. This orientation of the panels with respect to the sun's travel will vary from geographical location to location. In addition the panels 18 are spaced apart in a distance "A" which for purposes of description will be called the maximum light aperture width. These light apertures are defined between the individual panels 18 and thus have narrow elongated shapes.

As the sun moves from east to west over the canopy and when the canopy is positioned so that the panels extend north to south, direct sunlight coming through these apertures will sweep across the growing area under the canopy as the sun moves. The width of the aperture and the movement of the sun will determine the amount of time the sunlight from a particular aperture will directly contact a unit of area under the canopy. By narrowing the aperture, the amount of time the direct sunlight contacts a particular area will be reduced, and by broadening or widening the aperture, the time will be increased. According to a particular feature of the present invention, the curved edges 22 of the individual panels 18 assist in controlling the effective width of the aperture as the sun moves. These curved edges 22 provide borders for the aperture which reduce the rate of change of the effective width of the aperture during the period that the sun is at its highest point.

Figure 2:
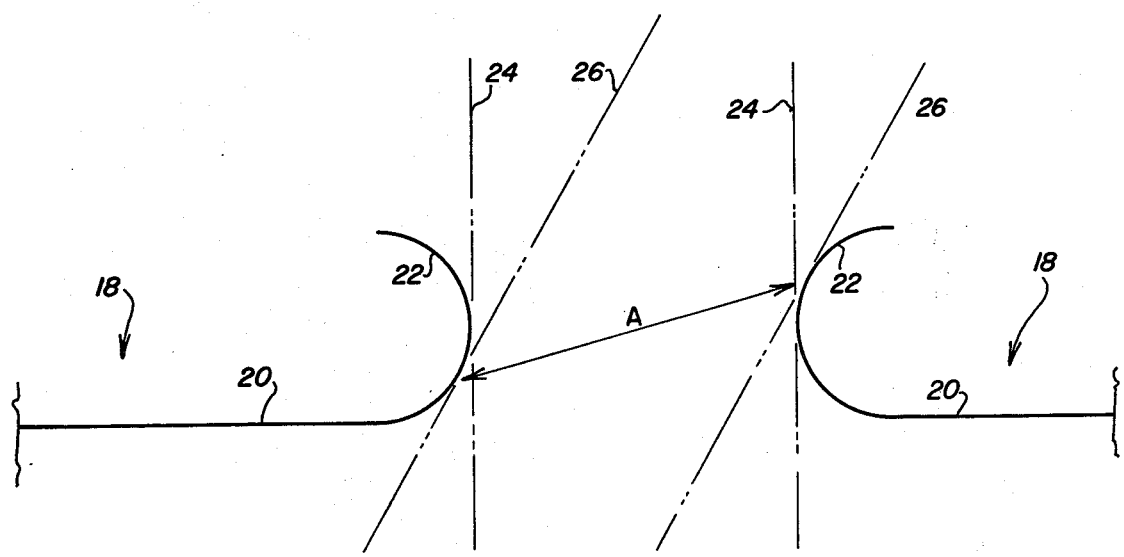
FIG. 2 is a partial cross-sectional view of the device taken along line 2—2 of FIG. 1 looking in the direction of the arrows.

In FIG. 2 the operation of arcuate or curved sides 22 and its effect on the light aperture is graphically illustrated. The phantom lines 24 illustrate the maximum width of the aperture "A" when the sun is at its highest point or directly over the canopy. This graphic illustration assumes parallel light rays. The effective width of the aperture when the sun is not directly over the canopy is illustrated by phantom lines 26. A comparison of the distance between the phantom lines 24 and 26, which is exaggerated for purposes of illustration, demonstrates that the borders of the apertures are determined by tangents of the curved edges 22 and do not change as drastically as square sided panels. Thus the spacing between the panels 18 can be set to provide an effective amount of sun as is desired in the particular environment to enter the canopy area.

In addition, the particular shape of the panels provide a means for transporting moisture from the top of the canopy with the panels acting as troughs to guide the water to the edge of the canopy and allow it to fall to the ground. This is especially important when canopies are placed over areas where the water is controlled by sprinkler systems and when the presence of excessive amounts of rain or the like from the atmosphere could unbalance the moisture content in the flower beds or flood the containers in which the plants are growing. Thus the curved edges provide the dual function of forming troughs for transmitting the water away from the top of the growing area and providing a boundary for the light aperture which minimizes the changes in the aperture width during movement of the sun during the high parts of the sun's movement. Thus the present invention provides a canopy area which is effective to control the moisture and light entering the growing area.

It is to be understood of course, that the foregoing disclosure relates only to a preferred embodiment of the present invention and that numerous alterations can be utilized to practice the present invention without departing from the spirit and scope of the invention as defined in the appended claims.

What is claimed is:

1. A canopy for covering a garden or plant growing area, comprising:
   an elevated support structure including a plurality of spaced support elements; and
   a plurality of uniformly spaced-apart elongated panel members extending transverse to said support elements and being supported therefrom, said panels being in a spaced parallel arrangement, each of said panels being formed from uniform thickness material and having a uniform cross section with a flat bottom portion and inwardly curved edge sections attached from each of the longitudinal edges of the bottom portion and extending upwardly therefrom to form a trough between the edge sections and above the bottom portion of each said panel, said inwardly curved edge sections being exclusively semicircular and integrally formed with the flat bottom portion of each said panel.

* * * * *